(12) United States Patent
Domingo Varona et al.

(10) Patent No.: US 10,617,141 B2
(45) Date of Patent: Apr. 14, 2020

(54) SLICING APPARATUS AND METHOD FOR MAKING VEGETABLE SLICES

(71) Applicant: Frito-Lay Trading Company GmbH, Berne (CH)

(72) Inventors: Elvira Domingo Varona, Leicester (GB); Alejandra Ibanez Revilla, Burgos (ES); Peter Usher, Loughborough (GB)

(73) Assignee: Frito-Lay Trading Company GmbH, Berne (CH)

( * ) Notice: Subject to any disclaimer, the term of this patent is extended or adjusted under 35 U.S.C. 154(b) by 270 days.

(21) Appl. No.: 15/840,814

(22) Filed: Dec. 13, 2017

(65) Prior Publication Data

US 2018/0160717 A1 Jun. 14, 2018

(30) Foreign Application Priority Data

Dec. 14, 2016 (GB) .................... 1621268.0

(51) Int. Cl.
*A23N 15/06* (2006.01)
*B26D 7/06* (2006.01)
*A23L 5/10* (2016.01)
*A23L 19/18* (2016.01)
(Continued)

(52) U.S. Cl.
CPC ............ *A23N 15/06* (2013.01); *A23L 5/10* (2016.08); *A23L 19/18* (2016.08); *B26D 1/03* (2013.01); *B26D 7/0691* (2013.01); *A23V 2002/00* (2013.01); *B26D 2001/0053* (2013.01)

(58) Field of Classification Search
CPC .... B26D 7/0691; B26D 1/03; B26D 2210/02; B26D 1/0006; B26D 3/26; B26D 1/40; B26D 1/62; B26D 2001/006; B26D 7/08; B26D 2001/0053; B26D 2001/0046; B26D 3/22; B26D 5/00; B26D 7/27;
(Continued)

(56) References Cited

U.S. PATENT DOCUMENTS

2010/0015312 A1* 1/2010 Bellmunt-Molins ........................ B26D 1/0006
426/518
2016/0075047 A1 3/2016 Bucks

FOREIGN PATENT DOCUMENTS

| GB | 826166 A1 | 12/1959 |
| GB | 2172185 A | 9/1986 |
| JP | 2003285294 A | 10/2003 |

* cited by examiner

*Primary Examiner* — Hong T Yoo
(74) *Attorney, Agent, or Firm* — Barnes & Thornburg LLP; G. Peter Nichols

(57) ABSTRACT

A stationary slicing head assembly for use with a centrifugal slicing machine for cutting vegetables into slices. The assembly includes a plurality of slicing shoes serially arranged around an impeller having an axis of rotation. A first end of each slicing shoe is positioned adjacent to a second end of a juxtaposed slicing shoe. A plurality of serially arranged knife blades, each knife blade being secured to the first end of a slicing shoe, wherein each knife blade has a cutting edge/has a cutting edge profile defined with respect to the shape of the cutting edge defining a two-dimensional shape of a cut surface produced by the cutting edge. Some of the knife blades are first knife blades which have a first profile, and second knife blades have a second profile. The arrangement of the first and second knife blades configured to cut first and second slices from a vegetable.

41 Claims, 7 Drawing Sheets

(51) Int. Cl.
*B26D 1/03* (2006.01)
*B26D 1/00* (2006.01)

(58) Field of Classification Search
CPC . B26D 3/185; B26D 7/06; B26D 1/36; B26D 7/2614; B26D 7/2628
See application file for complete search history.

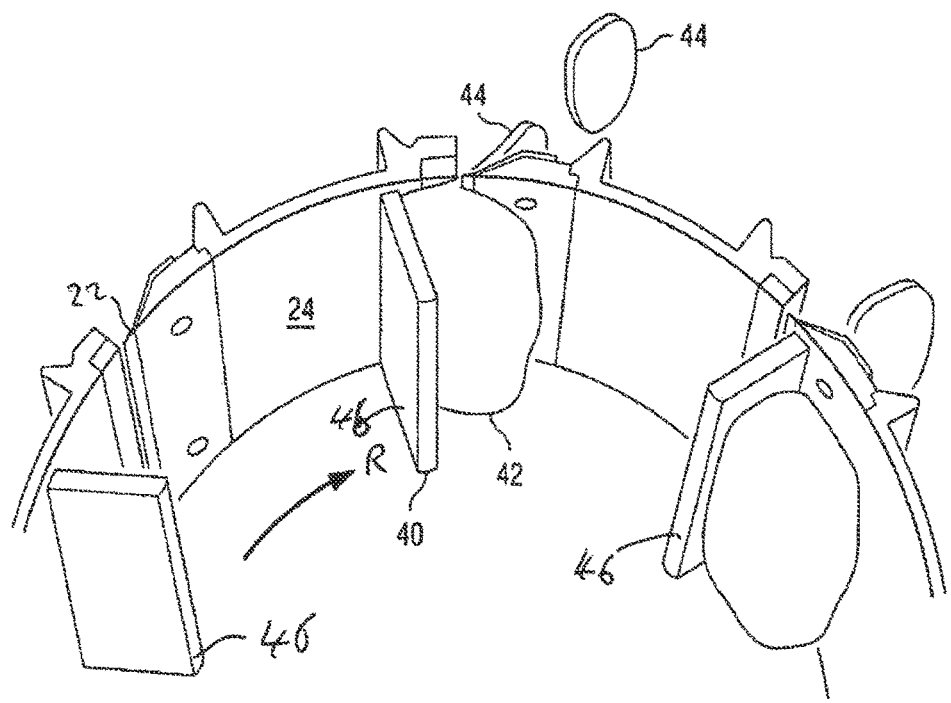
*FIG. 4*
*(PRIOR ART)*
Figure 5
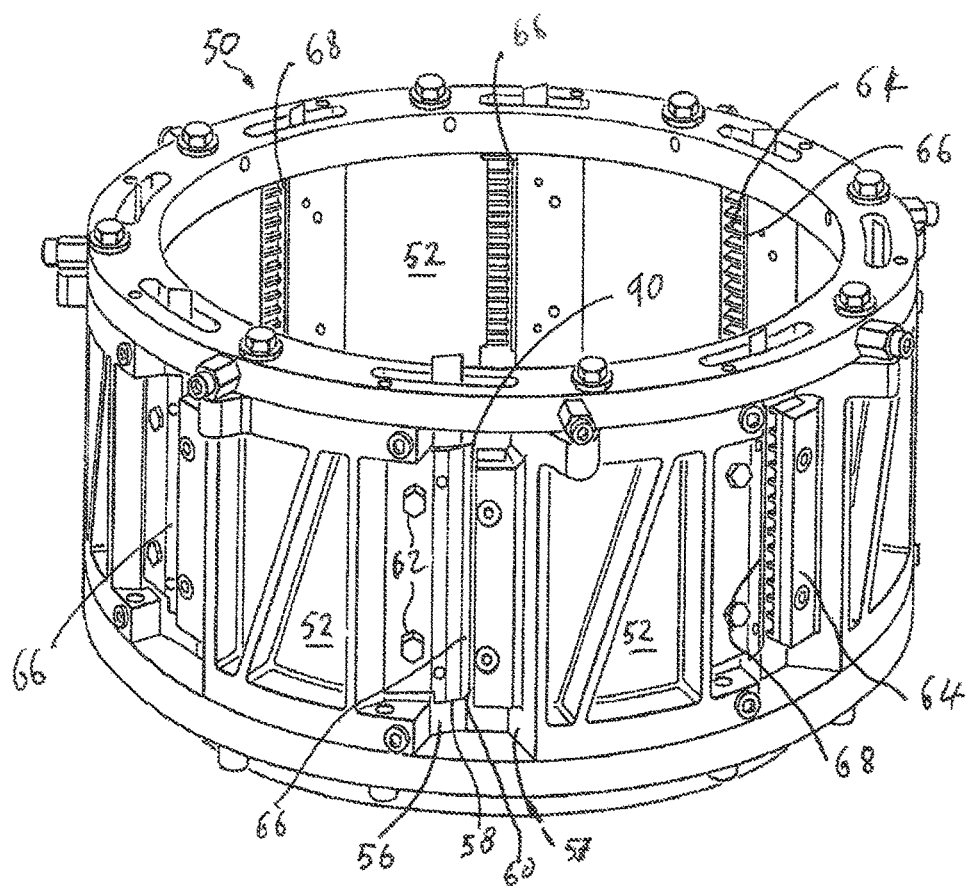

SLICING APPARATUS AND METHOD FOR MAKING VEGETABLE SLICES

CROSS-REFERENCE TO RELATED APPLICATION

This application claims priority to GB Application 1621268.0 filed Dec. 14, 2016, the disclosures of which are incorporated herein by reference.

TECHNICAL FIELD

The present invention relates to a stationary slicing head assembly for use with a centrifugal slicing machine for cutting vegetables into slices. The present invention also relates to a method of making vegetable slices using a centrifugal slicing machine. The present invention has particular application to the manufacture of vegetable chips, for example potato chips.

DESCRIPTION OF RELATED ART

There are a number of methods for slicing food products as a pre-processing step to producing food products in the industry. Various machines and methods have been manufactured for the commercial production of ready-to-eat food products, such as potato or other vegetable or fruit chips, to produce chips of a variety of textures and sizes to appeal to the different preferences of consumers.

Centrifugal slicing machines are well known in the art. These machines allow for the production of generally flat slices which may or may not contain some texture along the surface. The knife blades currently used remain straight and elongated, generally confined to the same plane, producing generally flat potato slices. However, the knife blades may have different cutting edge profiles to cut different slice surfaces. The cutting edge profile is defined with respect to the shape of the cutting edge in a direction corresponding to a thickness direction of the knife blade, the cutting edge profile defining a two-dimensional shape of a cut surface produced by the cutting edge. For example, a flat cutting edge profile produces a flat slice surface, while a cutting edge profile having a number of waves or ridges along its cutting edge produces either a wavy or ridged slice surface, respectively.

A known centrifugal slicer such as that manufactured and sold by Urschel Laboratories, Inc. of Valparaiso, Ind., USA as an Urschel Model CC, is seen in FIGS. 1-4. Only those components necessary for an understanding of this invention will be described. The stationary slicing head assembly 12 comprises eight slicing shoes 20 positioned in a generally cylindrical shape within which an impeller 40 is rotatably mounted on a gear box 16 to be driven by a suitable driving means such as a motor (not shown). Each slicing shoe 20 has a stationary slicing blade 22 is attached at a front end of the shoe 20 by means of bolts 26. As shown in FIGS. 2 and 3, each blade 22 is generally straight, having edges that fall within the same plane. A sand gate 25 also having a straight edge is attached at a rear end of the casting 20 to trap sand, dirt and other kinds of debris. Referring to FIG. 4, product that enters through the feed hopper 10 is caused by the centrifugal forces of the rotation to move outwardly around the interior of the slicing head assembly 12, and the impeller 40, having a plurality of paddles 46 which bear against the trailing edge of the food product 42, rotates in the direction of the arrow R, causing food product 42, such as a potato, to move against the flat interior walls 24, causing the straight blades 22 to create flat slices 44.

Market studies have shown that consumers of vegetable chips, in particular potato chips, crave more variety in terms of shape. It is known to produce flat chips. It is also known to produce ridged or crinkle cut chips. Current production processes and associated apparatus for the manufacture of potato chips only allow for the production of a single slice design at a time on a single production line.

Recently, bags of potato chips have been sold which package a mix of potato chip designs, for example a mix of flat chips and crinkle cut chips. Such a mixture within a single bag is consumer motivating. However, the manufacture of such a bag containing mixed chip designs is expensive to manufacture and it is difficult to achieve high product quality and efficient production. This is because each chip design must be manufactured using an individual product stream on a respective individual production line, each production line including, at least, dedicated slicing and frying stations, and producing a product stream of fried chips. The product streams are then combined prior to a common packaging station which packages the mixture of chip designs. The slicing and frying operations on each stream are set up to achieve the desired product quality for the respective chip design, in particular the desired moisture content of the resultant chip. The moisture contents of the different chip designs should be generally aligned, so that substantially equivalent degrees of cooking have been achieved for the different chip designs.

Such a known chip production process suffers from a number of problems. The process is not readily scaleable to vary the proportions of the different chip designs in the final mixture while operating the individual production lines under optimal manufacturing conditions and at optimal capacity. Also, some potato chip production lines have multiple slicers supplying a single fryer. Sometimes, individual slicers are out of action, for example for maintenance. When the plural production lines are continuously feeding a common packaging station, if a slicer is out of use in one production line, for example for maintenance or periodic blade replacement, the production rate of the chip design made on that production line would reduce, and thereby would alter the weight, volume and number ratio of the different chip designs in the final mixture, which is undesirable. The combining step may also impact on product integrity, with enhanced possibility of product contamination by an extraneous object introduced at the combination point. The requirement for plural production lines increases the capital cost, operating cost and maintenance cost of the production of mixed chip designs which are commonly packaged.

It is an object of the present invention at least partially to overcome at least some of these problem with the manufacture of mixed chip designs which are commonly packaged.

SUMMARY OF THE INVENTION

The present invention accordingly provides a stationary slicing head assembly for use with a centrifugal slicing machine for cutting vegetables into slices, the slicing head assembly comprising a plurality of slicing shoes serially arranged in a generally cylindrical arrangement around an impeller having an axis of rotation, wherein a first end of each slicing shoe is positioned adjacent to a second end of a juxtaposed slicing shoe, and a plurality of serially arranged knife blades, each knife blade being secured to the first end of a respective one of the slicing shoes, wherein each knife blade has a cutting edge which protrudes towards the impeller in a common rotational direction around the slicing head assembly and has a cutting edge profile defined with respect to the shape of the cutting edge in a direction corresponding to a thickness direction of the knife blade, the cutting edge profile defining a two-dimensional shape of a cut surface produced by the cutting edge, wherein at least some of the plurality of serially arranged knife blades are first knife blades which have a cutting edge profile of a first shape and at least one of the plurality of serially arranged knife blades is a second knife blade which has a cutting edge profile of a second shape, the serial arrangement of the first and second knife blades around the slicing head assembly being configured to cut first and second slices from a vegetable, the first slice having opposed cut surfaces each cut by the first knife blade and the second slice having first and second opposed cut surfaces, the first opposed cut surface being cut by the first knife blade and the second opposed cut surface being cut by the second knife blade.

The present invention further provides a method of making vegetable slices using a centrifugal slicing machine having an impeller with an axis of rotation surrounded by a slicing head assembly comprising a plurality of slicing shoes serially arranged in a generally cylindrical arrangement around the impeller, a first end of each slicing shoe being positioned adjacent to a second end of a juxtaposed slicing shoe, and a plurality of serially arranged knife blades, each knife blade being secured to the first end of a respective one of the slicing shoes, wherein each knife blade has a cutting edge which protrudes towards the impeller in a common rotational direction around the slicing head assembly and has a cutting edge profile defined with respect to the shape of the cutting edge in a direction corresponding to a thickness direction of the knife blade, the method comprising the steps of:

a) inserting at least one vegetable into said impeller;

b) causing said impeller to rotate such that the at least one vegetable is forced away from the axis of rotation and towards the knife blades; and c) slicing said at least one vegetable with the cutting edge of the knife blades, each vegetable being successively cut by successive knife blades, with respect to a rotational direction of the impeller, of the plurality of serially arranged knife blades, wherein the cutting edge profile of each knife blade forms a two-dimensionally shaped cut surface produced by the respective cutting edge, wherein at least some of the plurality of serially arranged knife blades are first knife blades which have a cutting edge profile of a first shape and at least one of the plurality of serially arranged knife blades is a second knife blade which has a cutting edge profile of a second shape, the serial arrangement of the first and second knife blades around the slicing head assembly cutting first and second slices from the vegetable, the first slice having opposed cut surfaces each cut by the first knife blade and the second slice having first and second opposed cut surfaces, the first opposed cut surface cut by the first knife blade and the second opposed cut surface cut by the second knife blade.

Preferred features are defined in the dependent claims.

The stationary slicing head assembly for use with a centrifugal slicing machine, and the method of making vegetable slices using such a centrifugal slicing, according to the present invention can enable the production of a mixture of chip designs from a single slicing head which can allows a consistent scaleable mix of chip designs to be produced in a production cycle on a single production line having a single slicing station and a single frying station, and avoiding a mixing station, all upstream of a single packaging station. The process is readily scaleable to vary the proportions of the different chip designs in the final mixture while operating the production line under optimal manufacturing conditions and at optimal capacity, because the number of the different blade designs in the common cutting head can readily be varied. Avoiding a combining step increases product integrity. The use of a single production line reduces the capital cost, operating cost and maintenance cost of the production of mixed chip designs which are commonly packaged.

In the preferred embodiments of the present invention the single cutting head can produce a mix of three slice designs by providing two blade designs. The order of the blades around the head, in the rotational direction of the impeller, determines what cut surfaces are formed when cutting the slice from the vegetable body, for example from a potato. As a vegetable rotates around the interior cylindrical surface of the stationary cutting head, the outward surface is successively cut by the annular array of blades. A first cut by a first blade cuts away a slice and also cuts a surface of the following slice to be cut. The rotationally adjacent blade then cuts away the following slice and also cuts a surface of the next slice to be cut. When two blade designs of a first type, for example with a flat cutting edge, are rotationally adjacent, the following slice has two opposed cut surfaces which are flat, and a flat chip is produced. When two blade designs of a second type, for example with a ridged or wavy cutting edge, are rotationally adjacent, the following slice has two opposed cut surfaces which are ridged or wavy, and a ridged or crinkle cut chip is produced. When two blade designs of the first and second type, are rotationally adjacent, in either order, the following slice has two opposed cut surfaces one of which is flat and the other of which is ridged or wavy, and a "hybrid" chip is produced which has a flat surface and an opposed ridged or crinkle cut surface. Any two different blade designs may be provided, and optionally third or further blade designs may also be provided to further increase the variety of the chip designs of the mixture of chips. The different chip designs provide different chip textures which are discernable by the consumer by providing different mouthfeel when consumed; for example a ridged chip, a flat chip and a hybrid ridged/flat chip not only exhibit different visual appearances in the packaging prior to consumption but also provide a different mouthfeel when consumed. A single production line having a cutting head set up with plural blade designs having plural cutting edge profiles (or plural such cutting heads in the production line) can slice a common supply of vegetables such as potatoes and produce a common output of vegetable slices to be fed to a common cooking apparatus such as a fryer.

In the preferred embodiments of the present invention, the blade designs, and the cutting dimensions, are selected so that in the resultant mixture of cooked chips, e.g. fried chips, which have been commonly cooked and commonly packaged, the slicing and cooking operations are set up to achieve the desired product quality for each chip design. In particular, by controlling the average thickness of the cut slices, the desired moisture content of the resultant chip can be controlled, so that after cooking the moisture contents of the different chip designs are substantially aligned, and substantially equivalent degrees of cooking have been achieved for the different chip designs. This provides in turn that the different chip designs in the commonly packaged mixture exhibit substantially uniform moisture content and degrees of cooking, but different texture and mouthfeel, when consumed by the consumer.

BRIEF DESCRIPTION OF THE DRAWINGS

Embodiments of the present invention will now be described by way of example only with reference to the following drawings, in which:

FIG. 4 is a partial, perspective view demonstrating the known slicing of food products using the known centrifugal slicing machine of FIG. 1;

FIG. 5 is a perspective view of a stationary slicing head assembly for use with a centrifugal slicing machine for cutting vegetables into slices according to an embodiment of the present invention;

The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

DETAILED DESCRIPTION OF THE INVENTION

Figure 8:
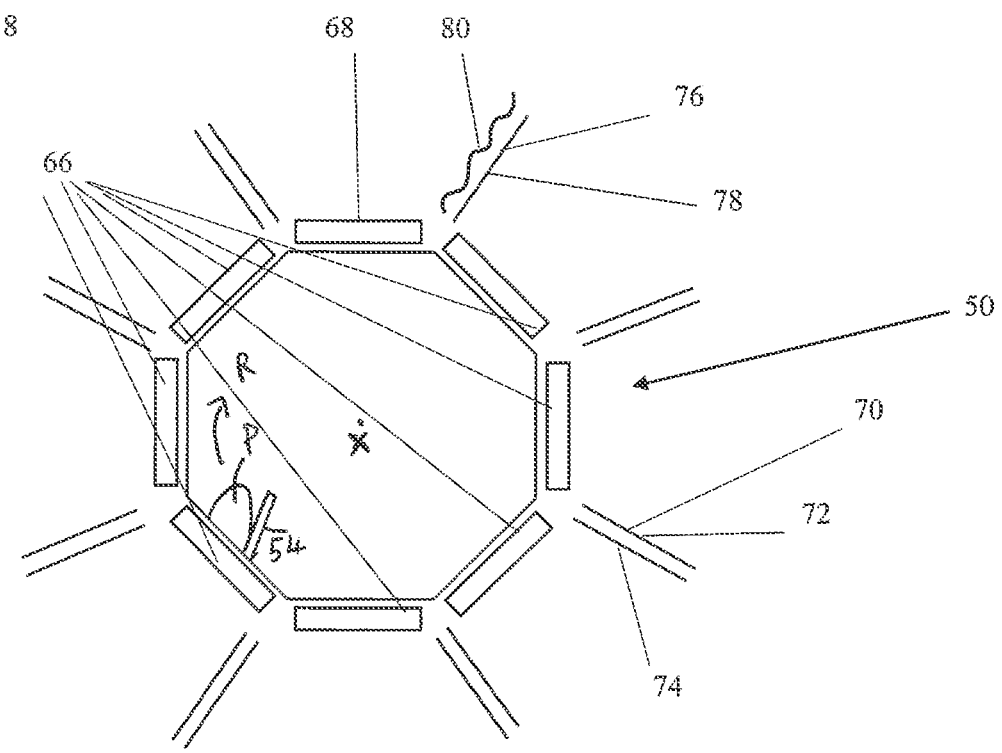
FIG. 8 is a plan view schematically illustrating a first arrangement of the blades in the slicing head assembly of FIG. 5.

Referring to FIGS. 5 and 8, there is schematically illustrated a stationary slicing head assembly 50 for use with a centrifugal slicing machine for cutting vegetables into slices according to an embodiment of the present invention. The slicing head assembly 50 comprises a plurality of slicing shoes 52 serially arranged in a generally cylindrical arrangement around an impeller 54 having an axis of rotation (one blade of the impeller 54 is shown in FIG. 8 rotating a potato P in a rotational direction R about axis X). A first end 56 of each slicing shoe 52 is positioned adjacent to a second end 57 of a juxtaposed slicing shoe 52. The slicing head assembly 50 further comprises a plurality of serially arranged knife blades 58. Each knife blade 58 is secured to the first end 56 of a respective one of the slicing shoes 52. Each knife blade 58 has a cutting edge 60 which protrudes towards the impeller 54 in a common rotational direction, which opposes the rotational direction R of motion of the impeller 54, around the slicing head assembly 50.

The knife blades 58 are secured to the slicing shoes 52 is any convenient manner, for example by bolts 62 as known to the person skilled in the art and as shown in FIGS. 1 to 4. In addition, sand gates 64 are provided adjacent to the knife blades 58, as also known to the person skilled in the art and as shown in FIGS. 1 to 4.

Each knife blade 58 has a cutting edge profile defined with respect to the shape of the cutting edge 60 in a direction corresponding to a thickness direction of the knife blade 58. The cutting edge profile defines a two-dimensional shape of a cut surface produced by the cutting edge 60.

At least some of the plurality of serially arranged knife blades 58 are first knife blades 66 which have a cutting edge profile of a first shape and at least one of the plurality of serially arranged knife blades 58 is a second knife blade 68 which has a cutting edge profile of a second shape. In the illustrated embodiment there are plural second knife blades 68.

Figure 1:
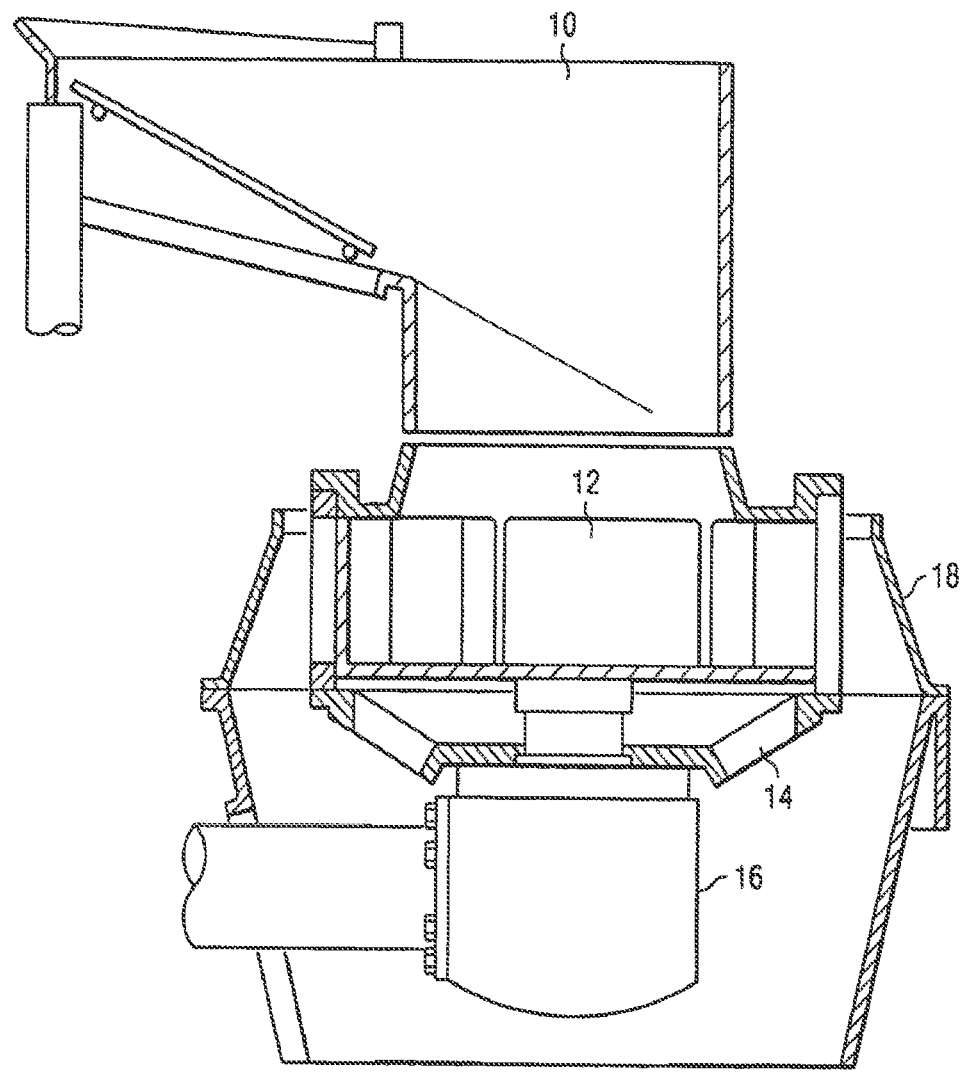
FIG. 1 is a partial side view of a known centrifugal slicing device with a known slicing head assembly.
Figure 2:
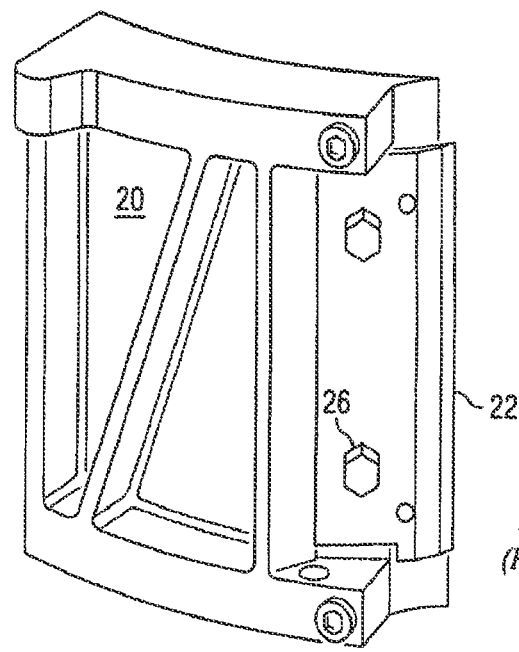
FIG. 2 is a close-up view of a slicing shoe and blade in the device of FIG. 1.
Figure 3:
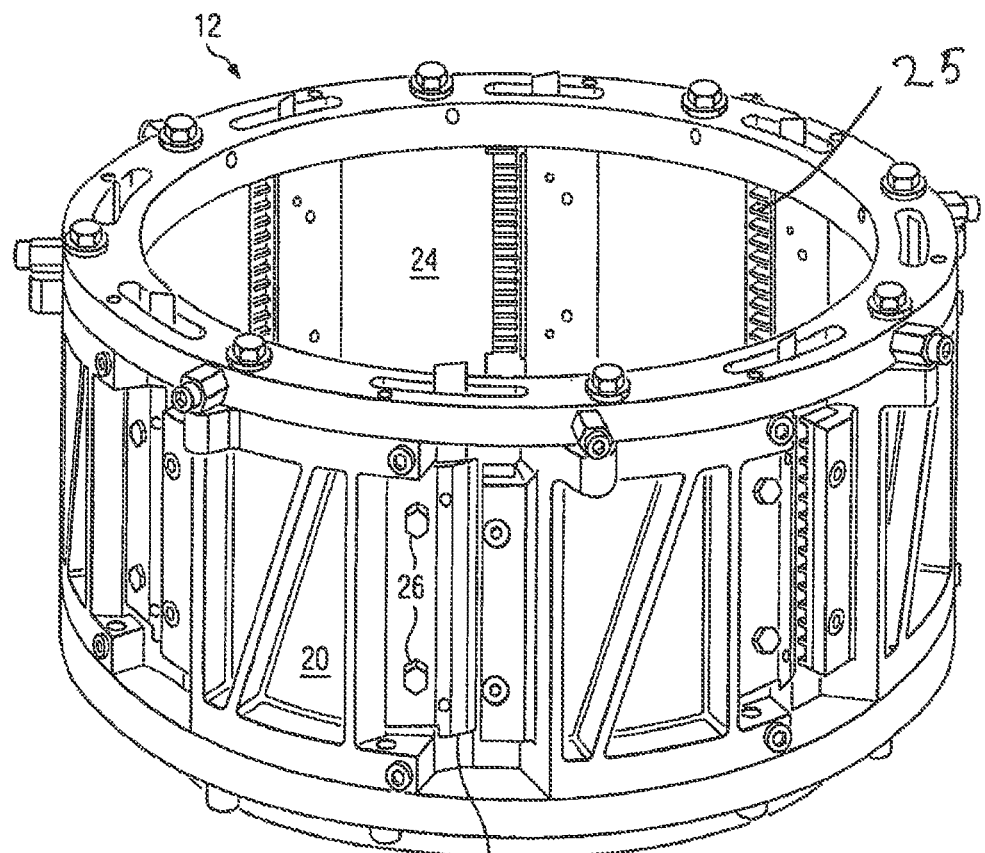
FIG. 3 is a perspective view of the slicing head assembly of FIG. 1.
Figure 6:
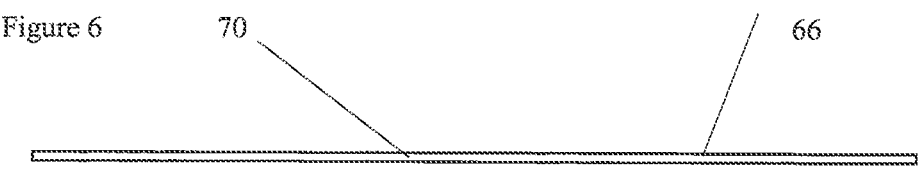
FIG. 6 is a front view of a flat blade incorporated in the slicing head assembly of FIG. 5.
Figure 7:
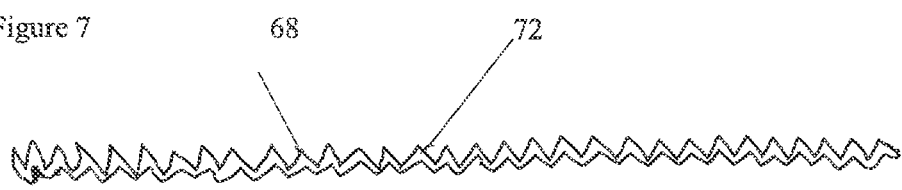
FIG. 7 is a front view of a ridged or wavy blade incorporated in the slicing head assembly of FIG. 5.

As shown in FIG. 6, the first knife blade 66 has a planar cutting edge profile 70. As shown in FIG. 7, the second knife blade 68 has a non-planar cutting edge profile 72, in particular a ridged or wavy cutting edge profile 72.

The serial arrangement of the first and second knife blades 66, 68 around the slicing head assembly 50 is configured to cut first and second slices from a vegetable, for example a potato. The first slice has opposed cut surfaces each cut by the first knife blade 66 and the second slice has first and second opposed cut surfaces, the first opposed cut surface being cut by the first knife blade 66 and the second opposed cut surface being cut by the second knife blade 68.

A first blade configuration is shown in FIG. 8, in which plural first knife blades 66 have a planar cutting edge profile and one second knife blade 68 has a non-planar cutting edge profile. Also, the iompeller 54 (only one impeller paddle is shown for clarity of illustration, but typically there are 5 to 10 paddles of the impeller) is shown rotating a potato P around the rotational direction R about the axis X. It can be seen that such a blade configuration produces first slices 70 having opposed flat cut surfaces 72, 74 each cut by the first knife blade 66 and second slices 76 having a first flat cut surface 78 cut by the first knife blade 66 and a second opposed non-planar, for example ridged or wavy, cut surface 80 cut by the second knife blade 68. Alternatively, there may be plural second knife blades 68 having a non-planar cutting edge profile and one first knife blade 66 having a planar cutting edge profile.

In alternative embodiments, the first knife blades 66 have a first non-planar cutting edge profile and the at least one second knife blade 68 has a second non-planar cutting edge profile, the first and second non-planar cutting edge profiles being different. For example, the first knife blades 66 have a ridged or wavy cutting edge profile of a first shape and dimensions and the at least one second knife blade 68 has a ridged or wavy cutting edge profile of a second shape and dimensions.

Figure 9:
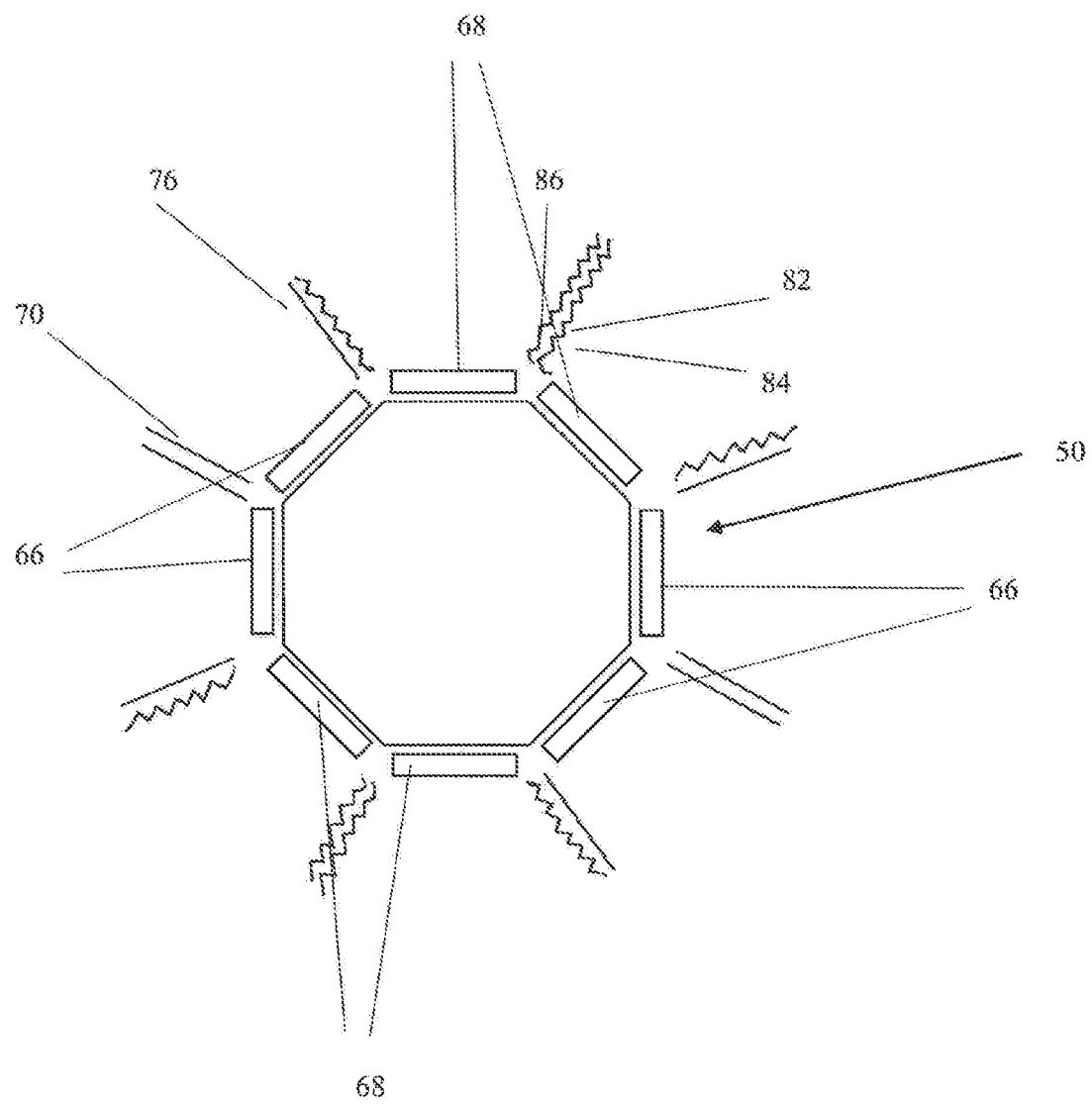
FIG. 9 is a plan view schematically illustrating a second arrangement of the blades in the slicing head assembly of FIG. 5.

A second blade configuration is shown in FIG. 9, in which there are plural first knife blades 66 having a planar cutting edge profile and plural second knife blades 68 having a non-planar cutting edge profile. The serial arrangement of the first and second knife blades 66, 68 around the slicing head assembly 50 is configured additionally to cut third slices 82 from the vegetable, the third slice 82 having opposed non-planar, for example ridged or wavy, cut surfaces 84, 86 each cut by the second knife blade 68. The serial arrangement of the first and second knife blades 66, 68 around the slicing head assembly 50 is configured to form a first series of first knife blades 66 and a second series of second knife blades 68, the first and second series being directly mutually adjacent. In this embodiment there are alternating series of pairs of the first knife blades 66 and second knife blades 68.

Figure 10:
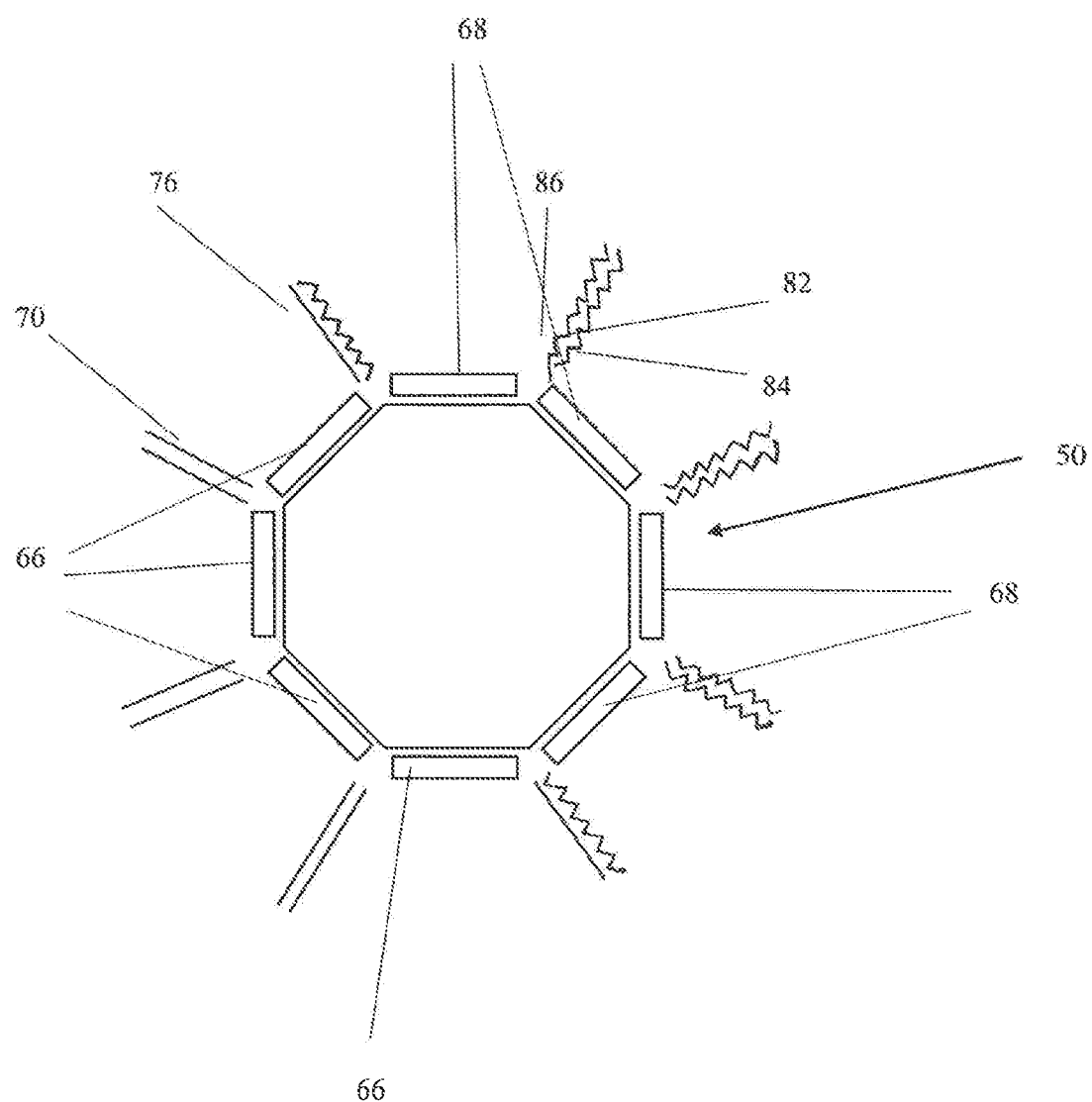
FIG. 10 is a plan view schematically illustrating a third arrangement of the blades in the slicing head assembly of FIG. 5.

A third blade configuration is shown in FIG. 10, in which plural first knife blades 66 have a planar cutting edge profile and plural second knife blades 68 have a non-planar cutting edge profile. The serial arrangement of the first and second knife blades 66, 68 around the slicing head assembly 50 is configured additionally to cut third slices 82 from the vegetable, the third slice 82 having opposed non-planar, for example ridged or wavy, cut surfaces 84, 86 each cut by the second knife blade 68. As shown in FIG. 10, the first and second knife blades 66, 68 are in an irregular serial arrangement around the slicing head assembly 50 in which the first and second knife blades 66, 68 are in an irregular order around the around the slicing head assembly 50. This provides that at least one first knife blade 66 is located between a pair of first knife blades 66 directly adjacent thereto and at least one first knife blade 66 is located between a first knife blade 66 and a second knife blade 68 directly adjacent thereto.

In any embodiment, when there is a plurality of second knife blades 68, there may be the same or a different number of first knife blades 66 and second knife blades 68 in the irregular serial arrangement around the slicing head assembly 50.

In the preferred embodiments of the slicing head assembly 50 of the present invention, as shown in FIGS. 9 and 10, the blade configuration is adapted to cut a first slice 70 having opposed planar cut surfaces 72, 74, a second slice 76 having a planar cut surface 78 and an opposed ridged or wavy cut surface 80 and a third slice 82 having opposed ridged or wavy cut surfaces 84, 86.

Figure 11:
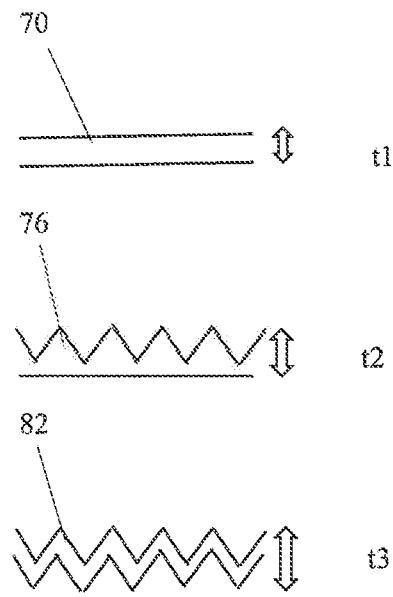
FIG. 11 schematically illustrates the cross-sections of three chips produced using the slicing head assembly of FIG. 5.

As shown in FIG. 11, which is not to scale, the assembly 50 is adapted to cut the first slice 70 with a first average thickness t1, the second slice 76 with a second average thickness t2 and the third slice 82 with a third average thickness t3, wherein the first, second and third average thicknesses t1, t2 and t3 are different.

The first average thickness t1 is smaller than the second and third average thicknesses t2 and t3, and the second average thickness t2 is smaller than the third average thickness t3.

Typically, the first average thickness t1 is from 1.2 to 1.5 mm, the second average thickness t2 is from 1.85 to 2.15 mm, and the third average thickness t3 is from 2.6 to 2.9 mm. More typically, the first average thickness t1 is from 1.3 to 1.4 mm, the second average thickness t2 is from 1.95 to 2.10 mm and the third average thickness t3 is from 2.70 to 2.85 mm.

When cutting potatoes, in particular, to achieve these slice thicknesses t1, t2 and t3 for the first, second and third slices, 70, 78 and 82, each knife blade 66, 68 defines a respective average blade gap 90 between the respective knife blade 66, 68 and a respective slicing shoe 52. The first slice 70 is cut successively by a pair of first knife blades 66 each having a planar cutting edge profile. The second slice 76 is cut successively, in either order, by a first knife blade 66 having a planar cutting edge profile and a second knife blade 68 having a ridged or wavy cutting edge profile. The third slice 82 is cut successively by a pair of second knife blades 68 each having a ridged or wavy cutting edge profile.

As described above, the impeller 54 has a rotational direction R around the axis of rotation X. For any first knife blade 66 which is serially adjacent, in a direction opposite to the rotational direction R, another first knife blade 66, the average blade gap 90 has a first dimension d1; for any first knife blade 66 which is serially adjacent, in a direction opposite to the rotational direction R, a second knife blade 68, the average blade gap 90 has a second dimension d2; for any second knife blade 68 which is serially adjacent, in a direction opposite to the rotational direction R, another second knife blade 68, the average blade gap 90 has a third dimension d3; and for any second knife blade 68 which is serially adjacent, in a direction opposite to the rotational direction R, a first knife blade 66, the average blade gap 90 has a fourth dimension d4.

The first dimension d1 is the smallest of the first to fourth dimensions d1 to d4, the second dimension d2 is smaller than the third and fourth dimensions d3 and d4, and either the third and fourth dimensions d3 and d4 are substantially the same, or the third dimension d3 is larger than the fourth dimension d4.

In a particularly preferred embodiment, the first dimension d1 is from 1.2 to 1.5 mm, the second dimension d2 is from 1.65 to 1.95 mm, the third dimension d3 is from 2.4 to 2.7 mm and the fourth dimension d4 is from 2.3 to 2.6 mm. Typically, the first dimension d1 is from 1.3 to 1.4 mm, the second dimension d1 is from 1.75 to 1.85 mm, the third dimension d3 is from 2.5 to 2.6 mm and the fourth dimension d4 is from 2.4 to 2.5 mm.

Figure 12:
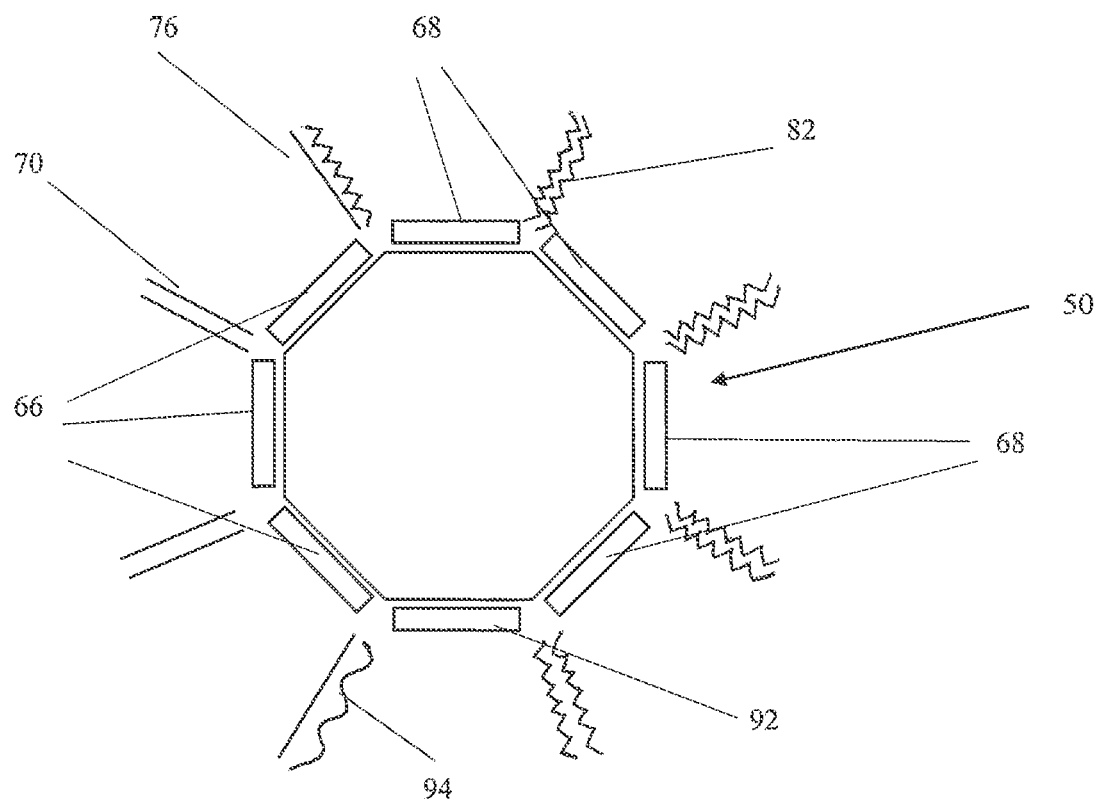
FIG. 12 is a plan view schematically illustrating a fourth arrangement of the blades in the slicing head assembly of FIG. 5.

The previous illustrated embodiments include first and second knife blades 66, 68. In any embodiment, as illustrated in FIG. 12, the assembly 50 may further comprise at least one third knife blade 92 which has a cutting edge which protrudes towards the impeller in the common rotational direction and has a cutting edge profile of a third shape. The serial arrangement of the first, second and third knife blades 66, 68, 92 around the slicing head assembly 50 is configured additionally to cut third slices from the vegetable. The third slice has opposed cut surfaces, one of which is cut by the first knife blade 66 as illustrated (or alternatively the second knife blade 68) and the other of which is cut by the third knife blade 92. Typically, the third knife blade 92 has a ridged or wavy cutting edge profile of a third shape and dimensions.

The slicing head assembly 50 is used in a method of making vegetable slices. Typically, the vegetable is potato and the method makes potato slices for the manufacture of potato chips. However, any other vegetable may be employed, for example sweet potato, parsnip, beetroot, aubergine (eggplant), cucumber, courgette (zucchini), etc.

The method uses a centrifugal slicing machine as described above having an impeller 54 with an axis of rotation is surrounded by the slicing head assembly 50. The method comprises inserting at least one vegetable into said impeller 54. Typically, a plurality of potatoes are inserted, as known in the art and as illustrated in FIG. 8. The impeller 54 is caused to rotate such that the at least one vegetable is forced away from the axis of rotation X and towards the knife blades 58. The at least one vegetable is sliced with the cutting edge 60 of the knife blades 58. Each vegetable is successively cut by successive knife blades 58, with respect to the rotational direction R of the impeller 54, of the plurality of serially arranged knife blades 58. The cutting edge profile of each knife blade 58 forms a two-dimensionally shaped cut surface 72, 74, 78, 80, 84, 86 produced by the respective cutting edge 60.

At least some of the plurality of serially arranged knife blades 58 are first knife blades 66 which have a cutting edge profile 70 of a first shape and at least one of the plurality of serially arranged knife blades 58 is a second knife blade 68 which has a cutting edge profile 72 of a second shape. The serial arrangement of the first and second knife blades 66, 68 around the slicing head assembly 50 cuts first and second slices 70, 76 from the vegetable, the first slice 70 having opposed cut surfaces 72, 74 each cut by the first knife blade 66 and the second slice 76 having first and second opposed cut surfaces 78, 80, the first opposed cut surface cut by the first knife blade 78 and the second opposed cut surface 80 cut by the second knife blade 68. In the embodiment of FIGS. 9 and 10, the serial arrangement of the first and second knife blades 66, 68 around the slicing head assembly 50 additionally cuts third slices 82 from the vegetable, the third slice 82 having opposed cut surfaces 84, 86 each cut by the second knife blade 68.

The cutting step preferably cuts a plurality of first slices 70 having opposed planar cut surfaces 72, 74, a plurality of second slices 76 having a planar cut surface 78 and an opposed ridged or wavy cut surface 80 and a plurality of third slices 82 having opposed ridged or wavy cut surfaces 84, 86. The first slice 70, the second slice 76 and the third slice 82 may have the average thicknesses described above.

Typically, in the cutting step is cut a plurality of the first, second and third slices 70, 76 and 82 as described above, and each knife blade 66, 68 defines a respective average blade gap 90 between the respective knife blade 66, 68 and a respective slicing shoe 52, wherein the first slice 70 is cut successively by a pair of first knife blades 66e each having a planar cutting edge profile 70, the second slice 76v is cut successively, in either order, by a first knife blade 66 having a planar cutting edge profile 70 and a second knife blade 68 having a ridged or wavy cutting edge profile 72, and the third slice 82 is cut successively by a pair of second knife blades 68 each having a ridged or wavy cutting edge profile 72.

As described above, the first knife blades 66 and second knife blades 68 may have average blade gaps defined by the first to fourth dimensions d1 to d4.

The slices can then be further processed to reduce the moisture of the products, producing ready-to-eat snacks. When cooked by means such as frying or baking, vegetable chips can be manufactured.

The preferred embodiments therefore also provide a method of manufacturing vegetable chips. The method comprises making first and second vegetable slices, for example as described with reference to FIG. 8, or first, second and third vegetable slices, for example as described with reference to FIGS. 9 and 10. The centrifugal slicing machine produces a single output flow of the vegetable slices. Then the single output flow of the vegetable slices is fed to a cooking apparatus, for example a baking or frying apparatus. The single output flow of the vegetable slices is cooked in the cooking apparatus, either by continuous cooking or batch cooking, to form a single product output of vegetable chips having, respectively, first and second chip cross-sections or first, second and third chip cross-sections. The single product output of vegetable chips is then optionally topically seasoned and conveyed to a packaging machine in which measured portions of the single product output of vegetable chips are packaged into respective individual packages. Each measured portion comprises a plurality of vegetable chips having, respectively, the first and second chip cross-sections or the first, second and third chip cross-sections. With reference to FIG. 12, in another embodiment the measured portion comprises a plurality of vegetable chips having, in addition, a fourth chip cross-section.

It has been found that using the stationary slicing head assembly of the preferred embodiments of the present invention enables the simultaneous production, in a single centrifugal slicing machine, of vegetable slices having plural slice profiles. The slice ratios can readily be changed by altering the number of blades of each cutting profile. The production is scaleable by providing multiple slicing heads with the same blade configuration which feed a common production line upstream of a cooking apparatus such as a fryer.

By commonly producing three slice cross-section shapes, namely flat, ridged or wavy and hybrid flat/ridged or wavy, in particular employing the blade gap dimensions and slice thickness dimensions as described above, it has in particular been found that a mixed chip product can be manufactured which has acceptable uniformity of moisture content, and, when fried, uniformity of oil content.

The invention claimed is:

1. A stationary slicing head assembly for use with a centrifugal slicing machine for cutting vegetables into slices, the slicing head assembly comprising a plurality of slicing shoes serially arranged in a generally cylindrical arrangement around an impeller having an axis of rotation, wherein a first end of each slicing shoe is positioned adjacent to a second end of a juxtaposed slicing shoe, and a plurality of serially arranged knife blades, each knife blade being secured to the first end of a respective one of the slicing shoes, wherein each knife blade has a cutting edge which protrudes towards the impeller in a common rotational direction around the slicing head assembly and has a cutting edge profile defined with respect to the shape of the cutting edge in a direction corresponding to a thickness direction of the knife blade, the cutting edge profile defining a two-dimensional shape of a cut surface produced by the cutting edge, wherein at least some of the plurality of serially arranged knife blades are first knife blades which have a cutting edge profile of a first shape and at least one of the plurality of serially arranged knife blades is a second knife blade which has a cutting edge profile of a second shape, the serial arrangement of the first and second knife blades around the slicing head assembly including
   a. two of the first knife blades in a serially directly adjacent configuration for cutting a first slice from a vegetable, the first slice having opposed cut surfaces each cut by a respective one of the two first knife blades and
   b. one of the first knife blades and the second knife blade in a serially directly adjacent configuration for cutting a second slice from the vegetable, the second slice having first and second opposed cut surfaces, the first opposed cut surface being cut by the first knife blade and the second opposed cut surface being cut by the second knife blade.

2. A stationary slicing head assembly according to claim 1 wherein the serial arrangement of the first and second knife blades around the slicing head assembly includes two second knife blades in a serially directly adjacent configuration for cutting a third slice from the vegetable, the third slice having opposed cut surfaces each cut by a respective one of the second knife blades.

3. A stationary slicing head assembly according to claim 1 wherein the first knife blades have a planar cutting edge profile and the at least one second knife blade has a non-planar cutting edge profile.

4. A stationary slicing head assembly according to claim 3 wherein the at least one second knife blade has a ridged or wavy cutting edge profile.

5. A stationary slicing head assembly according to claim 1 wherein the first knife blades have a non-planar cutting edge profile and the at least one second knife blade has a planar cutting edge profile.

6. A stationary slicing head assembly according to claim 5 wherein the first knife blade has a ridged or wavy cutting edge profile.

7. A stationary slicing head assembly according to claim 1 wherein the first knife blades have a first non-planar cutting edge profile and the at least one second knife blade has a second non-planar cutting edge profile, the first and second non-planar cutting edge profiles being different.

8. A stationary slicing head assembly according to claim 7 wherein the first knife blades have a ridged or wavy cutting edge profile of a first shape and dimensions and the at least one second knife blade has a ridged or wavy cutting edge profile of a second shape and dimensions.

9. A stationary slicing head assembly according to claim 1 wherein the first and second knife blades are in an irregular serial arrangement around the slicing head assembly in which the first and second knife blades are in an irregular order around the slicing head assembly, so that at least one first knife blade is located between a pair of first knife blades directly adjacent thereto and at least one first knife blade is located between a first knife blade and a second knife blade directly adjacent thereto.

10. A stationary slicing head assembly according to claim 9 wherein there is a plurality of second knife blades and there is a different number of first knife blades and second knife blades in the irregular serial arrangement around the slicing head assembly.

11. A stationary slicing head assembly according to claim 9 wherein there is a plurality of second knife blades and there is the same number of first knife blades and second knife blades in the irregular serial arrangement around the slicing head assembly.

12. A stationary slicing head assembly according to claim 1 wherein the first and second knife blades are arranged around the slicing head assembly so as to form a first series of first knife blades and a second series of second knife blades, the first and second series being directly mutually adjacent.

13. A stationary slicing head assembly according to claim 2 which is adapted to cut the first slice having opposed planar cut surfaces, the second slice having a planar cut surface and an opposed ridged or wavy cut surface and the third slice having opposed ridged or wavy cut surfaces.

14. A stationary slicing head assembly according to claim 13 wherein the assembly is adapted to cut the first slice with a first average thickness, the second slice with a second average thickness and the third slice with a third average thickness, wherein the first, second and third average thicknesses are different.

15. A stationary slicing head assembly according to claim 14 wherein the first average thickness is smaller than the second and third average thicknesses, and the second average thickness is smaller than the third average thickness.

16. A stationary slicing head assembly according to claim 15 wherein the first average thickness is from 1.2 to 1.5 mm, the second average thickness is from 1.85 to 2.15 mm, and the third average thickness is from 2.6 to 2.9 mm.

17. A stationary slicing head assembly according to claim 16 wherein the first average thickness is from 1.3 to 1.4 mm, the second average thickness is from 1.95 to 2.10 mm and the third average thickness is from 2.70 to 2.85 mm.

18. A stationary slicing head assembly according to claim 2 which is adapted to cut the first slice having opposed planar cut surfaces, the second slice having a planar cut surface and an opposed ridged or wavy cut surface and the third slice having opposed ridged or wavy cut surfaces, and each knife blade defines a respective average blade gap between the respective knife blade and a respective slicing shoe, wherein the first slice is cut successively by a pair of first knife blades each having a planar cutting edge profile, the second slice is cut successively, in either order, by a first knife blade having a planar cutting edge profile and a second knife blade having a ridged or wavy cutting edge profile, and the third slice is cut successively by a pair of second knife blades each having a ridged or wavy cutting edge profile.

19. A stationary slicing head assembly according to claim 18 wherein the impeller has a rotational direction around the axis of rotation, and wherein for any first knife blade which is serially adjacent, in a direction opposite to the rotational direction, another first knife blade, the average blade gap has a first dimension, for any first knife blade which is serially adjacent, in a direction opposite to the rotational direction, a second knife blade, the average blade gap has a second dimension, for any second knife blade which is serially adjacent, in a direction opposite to the rotational direction, another second knife blade, the average blade gap has a third dimension, and for any second knife blade which is serially adjacent, in a direction opposite to the rotational direction, a first knife blade, the average blade gap has a fourth dimension.

20. A stationary slicing head assembly according to claim 19 wherein the first dimension is the smallest of the first to fourth dimensions, the second dimension is smaller than the third and fourth dimensions, and either the third and fourth dimensions are substantially the same or the third dimension is larger than the fourth dimension.

21. A stationary slicing head assembly according to claim 20 wherein the first dimension is from 1.2 to 1.5 mm, the second dimension is from 1.65 to 1.95 mm, the third dimension is from 2.4 to 2.7 mm and the fourth dimension is from 2.3 to 2.6 mm.

22. A stationary slicing head assembly according to claim 21 wherein the first dimension is from 1.3 to 1.4 mm, the second dimension is from 1.75 to 1.85 mm, the third dimension is from 2.5 to 2.6 mm and the fourth dimension is from 2.4 to 2.5 mm.

23. A stationary slicing head assembly according to claim 1 further comprising at least one third knife blade which has a cutting edge which protrudes towards the impeller in the common rotational direction and has a cutting edge profile of a third shape, the serial arrangement of the first, second and third knife blades around the slicing head assembly being configured additionally to cut a third slices from the vegetable, the third slice having opposed cut surfaces, one of which is cut by the first knife or second knife blade and the other of which is cut by the third knife blade.

24. A stationary slicing head assembly according to claim 23 wherein the third knife blade has a ridged or wavy cutting edge profile of a third shape and dimensions.

25. A method of making vegetable slices using a centrifugal slicing machine having an impeller with an axis of rotation surrounded by a slicing head assembly comprising a plurality of slicing shoes serially arranged in a generally cylindrical arrangement around the impeller, a first end of each slicing shoe being positioned adjacent to a second end of a juxtaposed slicing shoe, and a plurality of serially arranged knife blades, each knife blade being secured to the first end of a respective one of the slicing shoes, wherein each knife blade has a cutting edge which protrudes towards the impeller in a common rotational direction around the slicing head assembly and has a cutting edge profile defined with respect to the shape of the cutting edge in a direction corresponding to a thickness direction of the knife blade, the method comprising the steps of:
a) inserting at least one vegetable into said impeller;
b) causing said impeller to rotate such that the at least one vegetable is forced away from the axis of rotation and towards the knife blades; and
c) slicing said at least one vegetable with the cutting edge of the knife blades, each vegetable being successively cut by successive knife blades, with respect to a rotational direction of the impeller, of the plurality of serially arranged knife blades, wherein the cutting edge profile of each knife blade forms a two-dimensionally shaped cut surface produced by the respective cutting edge, wherein at least some of the plurality of serially arranged knife blades are first knife blades which have a cutting edge profile of a first shape and at least one of the plurality of serially arranged knife blades is a second knife blade which has a cutting edge profile of a second shape, the serial arrangement of the first and second knife blades around the slicing head assembly including (i) two of the first knife blades in a serially directly adjacent configuration for cutting a first slice from the vegetable, the first slice having opposed cut surfaces each cut by a respective one of the first knife blades and (ii) one of the first knife blades and the second knife blade in a serially directly adjacent configuration for cutting a second slice from the vegetable, the second slice having first and second opposed cut surfaces, the first opposed cut surface cut by the first knife blade and the second opposed cut surface cut by the second knife blade.

26. A method according to claim 25 wherein in step c) the serial arrangement of the first and second knife blades around the slicing head assembly includes two second knife blades in a serially adjacent configuration for additionally cutting a third slice from the vegetable, the third slice having opposed cut surfaces each cut by a respective one of the second knife blades.

27. A method according to claim 26 wherein in step c) is cut a plurality of first slices having opposed planar cut surfaces, a plurality of second slices having a planar cut surface and an opposed ridged or wavy cut surface and a plurality of third slices having opposed ridged or wavy cut surfaces.

28. A method according to claim 27 wherein in step c) the first slice has a first average thickness, the second slice has a second average thickness and the third slice has a third average thickness, wherein the first, second and third average thicknesses are different.

29. A method according to claim 28 wherein the first average thickness is smaller than the second and third average thicknesses, and the second average thickness is smaller than the third average thickness.

30. A method according to claim 29 wherein the first average thickness is from 1.2 to 1.5 mm, the second average thickness is from 1.85 to 2.15 mm, and the third average thickness is from 2.6 to 2.9 mm.

31. A method according to claim 30 wherein the first average thickness is from 1.3 to 1.4 mm, the second average thickness is from 1.95 to 2.10 mm and the third average thickness is from 2.70 to 2.85 mm.

32. A method according to claim 26 wherein in step c) is cut a plurality of first slices having opposed planar cut surfaces, a plurality of second slices having a planar cut surface and an opposed ridged or wavy cut surface and a plurality of third slices having opposed ridged or wavy cut surfaces, wherein each knife blade defines a respective average blade gap between the respective knife blade and a respective slicing shoe, wherein the first slice is cut successively by a pair of first knife blades each having a planar cutting edge profile, the second slice is cut successively, in either order, by a first knife blade having a planar cutting edge profile and a second knife blade having a ridged or wavy cutting edge profile, and the third slice is cut successively by a pair of second knife blades each having a ridged or wavy cutting edge profile.

33. A method according to claim 32 wherein for any first knife blade which is serially adjacent, in a direction opposite to the rotational direction, another first knife blade, the average blade gap has a first dimension, for any first knife blade which is serially adjacent, in a direction opposite to the rotational direction, a second knife blade, the average blade gap has a second dimension, for any second knife blade which is serially adjacent, in a direction opposite to the rotational direction, another second knife blade, the average blade gap has a third dimension, and for any second knife blade which is serially adjacent, in a direction opposite to the rotational direction, a first knife blade, the average blade gap has a fourth dimension.

34. A method according to claim 33 wherein the first dimension is the smallest of the first to fourth dimensions, the second dimension is smaller than the third and fourth dimensions, and either the third and fourth dimensions are substantially the same or the third dimension is larger than the fourth dimension.

35. A method according to claim 34 wherein the first dimension is from 1.2 to 1.5 mm, the second dimension is from 1.65 to 1.95 mm, the third dimension is from 2.4 to 2.7 mm and the fourth dimension is from 2.3 to 2.6 mm.

36. A method according to claim 35 wherein the first dimension is from 1.3 to 1.4 mm, the second dimension is from 1.75 to 1.85 mm, the third dimension is from 2.5 to 2.6 mm and the fourth dimension is from 2.4 to 2.5 mm.

37. A method according to claim 25 wherein the vegetable is potato and the method makes potato slices for the manufacture of potato chips.

38. A method of manufacturing vegetable chips, the method comprising the steps of: i) making first and second vegetable slices according to the method of claim 25, the centrifugal slicing machine producing a single output flow of the vegetable slices; ii) feeding the single output flow of the vegetable slices to a cooking apparatus; iii) cooking the single output flow of the vegetable slices in the cooking apparatus, either by continuous cooking or batch cooking, to form a single product output of vegetable chips having, respectively, first and second chip cross-sections or first, second and third chip cross-sections; iv) conveying the single product output of vegetable chips to a packaging machine; and v) packaging measured portions of the single product output of vegetable chips into respective individual packages, wherein each measured portion comprises a plurality of vegetable chips having, respectively, the first and second chip cross-sections or the first, second and third chip cross-sections.

39. A method according to claim 38 wherein the cooking is frying or baking.

40. A method of manufacturing vegetable chips, the method comprising the steps of: i) making first and second vegetable slices according to the method of claim 26, the centrifugal slicing machine producing a single output flow of the vegetable slices; ii) feeding the single output flow of the vegetable slices to a cooking apparatus; iii) cooking the single output flow of the vegetable slices in the cooking apparatus, either by continuous cooking or batch cooking, to form a single product output of vegetable chips having, respectively, first and second chip cross-sections or first, second and third chip cross-sections; iv) conveying the single product output of vegetable chips to a packaging machine; and v) packaging measured portions of the single product output of vegetable chips into respective individual packages, wherein each measured portion comprises a plurality of vegetable chips having, respectively, the first and second chip cross-sections or the first, second and third chip cross-sections.

41. A method of manufacturing vegetable chips, the method comprising the steps of: i) making first and second vegetable slices according to the method of claim 37, the centrifugal slicing machine producing a single output flow of the vegetable slices; ii) feeding the single output flow of the vegetable slices to a cooking apparatus; iii) cooking the single output flow of the vegetable slices in the cooking apparatus, either by continuous cooking or batch cooking, to form a single product output of vegetable chips having, respectively, first and second chip cross-sections or first, second and third chip cross-sections; iv) conveying the single product output of vegetable chips to a packaging machine; and v) packaging measured portions of the single product output of vegetable chips into respective individual packages, wherein each measured portion comprises a plurality of vegetable chips having, respectively, the first and second chip cross-sections or the first, second and third chip cross-sections.

* * * * *